United States Patent
Prebeck et al.

(10) Patent No.: US 6,578,450 B1
(45) Date of Patent: Jun. 17, 2003

(54) POWER-SPLITTING TRANSMISSION

(75) Inventors: Stefan Prebeck, Passau (DE); Michael Walser, Friedrichshafen (DE)

(73) Assignee: ZF Friedrichshafen AG, Friedrichshafen (DE)

(*) Notice: Subject to any disclaimer, the term of this patent is extended or adjusted under 35 U.S.C. 154(b) by 31 days.

(21) Appl. No.: 10/030,719

(22) PCT Filed: Jul. 8, 2000

(86) PCT No.: PCT/EP00/06492

§ 371 (c)(1),
(2), (4) Date: Jan. 10, 2002

(87) PCT Pub. No.: WO01/04515

PCT Pub. Date: Jan. 18, 2001

(30) Foreign Application Priority Data

Jul. 14, 1999 (DE) .......................... 199 32 806

(51) Int. Cl.⁷ .............................. F16H 47/02
(52) U.S. Cl. ...................... 74/730.1; 60/488
(58) Field of Search .................. 74/730.1, 731.1, 74/732.1, 733.1; 475/72, 78, 80; 60/488

(56) References Cited

U.S. PATENT DOCUMENTS

| | | |
|---|---|---|
| 3,213,616 A | 10/1965 | Reinke .................. 60/53 |
| 3,903,756 A | 9/1975 | Hamma .................. 74/687 |
| 3,999,387 A * | 12/1976 | Knopf .................. 60/488 |
| 5,129,867 A | 7/1992 | Fredriksen et al. .......... 475/79 |
| 5,230,519 A * | 7/1993 | Nishimura et al. .......... 475/83 |
| 5,328,418 A | 7/1994 | Meyerle .................. 475/81 |
| 5,394,698 A * | 3/1995 | Takagi et al. .................. 60/438 |
| 5,794,422 A * | 8/1998 | Reimers et al. .............. 56/11.9 |
| 6,042,496 A | 3/2000 | Lehle et al. .................. 475/81 |
| 6,086,336 A | 7/2000 | Welschof et al. ........... 417/308 |
| 6,109,032 A * | 8/2000 | Shimizu et al. ............... 60/487 |
| 6,387,005 B1 * | 5/2002 | Matsuyama et al. .......... 475/75 |

FOREIGN PATENT DOCUMENTS

| | | | |
|---|---|---|---|
| DE | 21 53 960 | 3/1973 | ........... B61K/17/10 |
| DE | 23 07 100 | 9/1974 | ........... F16H/47/02 |
| DE | 40 21 643 A1 | 1/1992 | ........... F16H/47/02 |
| DE | 195 22 833 A1 | 1/1997 | ........... F16H/47/04 |
| DE | 197 06 114 | 8/1998 | ........... F04B/11/00 |

* cited by examiner

Primary Examiner—Sherry Estremsky
(74) Attorney, Agent, or Firm—Davis & Bujold, P.L.L.C.

(57) ABSTRACT

A power-splitting transmission which consists of a hydraulic power branch (7) and a mechanical power branch. Leakage in the hydraulic power branch (7) as well as the activation apparatuses (12) in the mechanical power branch are supplied with a pressurized medium from a common pressure source (1). The common pressure source (1) transports pressure medium to the hydraulic power branch (7), through a damping apparatus (3), and simultaneously transports pressure medium to the activation apparatuses (12) of the shifting elements (13) of the mechanical power branch via a controller (11).

8 Claims, 1 Drawing Sheet

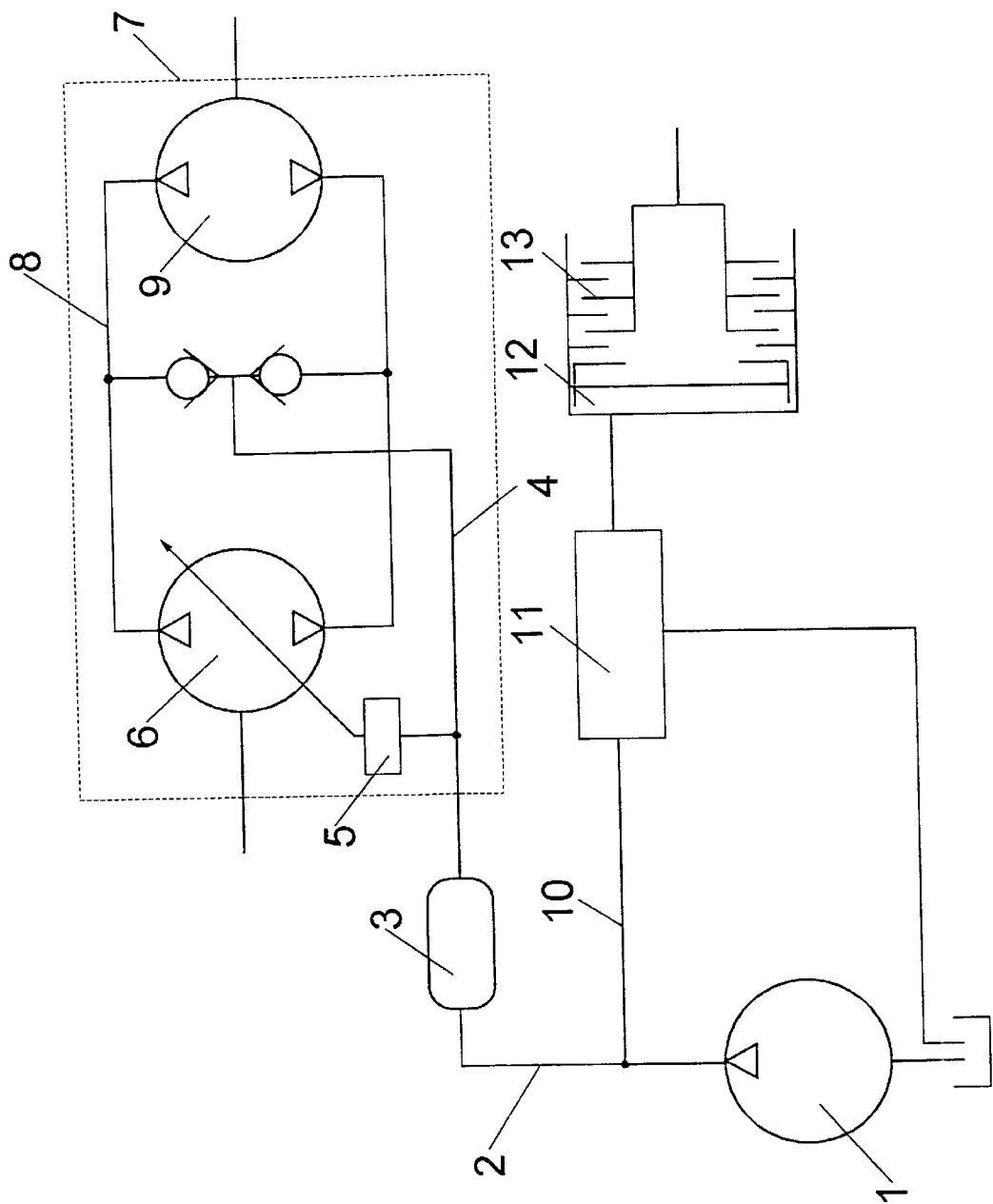

POWER-SPLITTING TRANSMISSION

FIELD OF THE INVENTION

The invention concerns a power-splitting transmission with both a hydraulic and a mechanical power branch.

BACKGROUND OF THE INVENTION

Hydraulic-mechanical power-splitting transmissions possess generally, first a hydraulic power branch in order, in one area of driving, to be able to change the gear ratio in a stepless manner, and second, a mechanical power branch, which allows shifting through various changes of gear. In the hydraulic power branch, hydrostatic pumps are advantageously employed, such as, for example, axial piston-pumps and/or constant volume pumps, which are adjustable in their delivered volumes. Adjustable hydrostatic motors, such as axial piston motors also find use.

DE 195 22 833 discloses a power-splitting transmission in which, with the mechanical power branch, shifting is possible through four forward (or reverse) gear ranges, and with the hydraulic power branch the speed of rotation, within these gear ranges, can be steplessly varied whereby, in an integrating transmission, both power drives are again combined. In the case of the mechanical power branch, different gear stages are arrived at with the help of friction clutches which are activated by hydraulic activation apparatuses. In order to start these activation apparatuses, a source of pressure (not shown) is required. The hydrostatic power branch comprises a volume-adjustable, hydrostatic pump which is driven by a hydrostatic motor. In order to direct delivery of the hydrostatic pump in both directions, the only possibility which exists is to operate the pump and its hydrostatic motor in a closed circuit, in other words, the output and intake openings of the hydrostatic pump are connected. The leakages, which are lost from this closed circuit, must be compensated for by another make-up pump.

DE 197 06 114 A1 proposes an apparatus for minimizing the pulsations of a hydrostatic positive displacement pump wherein, in the said positive displacement pump, a reservoir element is provided which damps the pulsations. Reservoir elements which, for example, are constructed as hydropneumatic tanks, can suffer wear in operation and then must be replaced.

Thus, the purpose of the present invention is to create a power-splitting transmission, with a hydraulic power branch and a mechanical power branch, which possesses a minimum number of components and is characterized by high efficiency.

SUMMARY OF THE INVENTION

In accord with the invention, the number of the components is reduced in that the power-splitting transmission employs only one source of pressure, in order to compensate for any leakage in the closed hydraulic power circuit and to supply the activation apparatuses of the shifting elements of the mechanical branch with pressure. The electrohydraulic regulation for the control of the activator apparatuses of the shifting elements of the mechanical power branch react sensitively to pressure variations and pressure pulsations. The hydraulic power branch, using positive displacement piston units, generates pressure pulsations. The said compensation is effected by one source of pressure for both pressure consuming units and having one damping apparatus available between the pressure source and the hydraulic power branch. It is advantageous to place this damping apparatus proximate to the pressure source, that is, the hydraulic power branch. Another possibility is to locate the damping apparatus at any other place in the transmission. If the damping apparatus is installed directly near the pulsation producer, that is, in the housing of the hydrostatic positive pressure unit, then an optimal action of the damping apparatus is brought about. In such case, the hydrostatic positive pressure unit can be placed with already damped pulsations in the housing of the power-splitting transmission. The pulsation damping apparatus preferably comprises a space which allows an expansion of the medium volume and thus diminishes the pulsations. Since this damping apparatus consists exclusively of an expansion of the volume in the line between the source of pressure and the hydraulic power branch, no components exist in the damping apparatus which can suffer abrasion and must be replaced. The space, which allows volume expansion, can be also cast in the housing of the power-splitting transmission whereby an additional reduction of the number of individual parts is gained. Additionally, the line from the source of pressure can also be cast in the housing of the power-splitting transmission. However, it is still possible that the line from the source of pressure to the hydraulic power branch can be made as a pipe line and the damping arrangement can be designed as a pipe section of a larger volume.

Since only one source of pressure first serves the activation apparatuses of the shifting elements of the mechanical power branch through a control unit and second, compensates for the leakage in the hydraulic power branch, the number of parts in the power-splitting transmission are reduced and the efficiency is increased.

BRIEF DESCRIPTION OF THE DRAWING

The invention will now be described, by way of example, with reference to the accompanying drawing.

DETAILED DESCRIPTION OF THE INVENTION

The single FIGURE shows, in a very simplified schematic drawing, the hydraulic pressure supply for a power-splitting transmission in which the pressure source 1 transports the pressure medium through line 2 to a damping apparatus 3. From the damping apparatus 3, the pressure medium is transported through a line 4 to a control unit 5 by which the transported volume of a hydrostatic pump 6 of a hydraulic power branch 7 is adjusted. At the same time, the pressure medium flows through the line 4 into a closed circuit 8. The closed circuit 8 is made by the connection of a hydrostatic motor 9 and the hydrostatic pump 6. Compensation for leakage in the closed circuit is effected since the pressure medium has access to the closed circuit 8 through the line 4. The pressure pulsations, which are generated in the hydraulic power branch 7, are smoothed out by the damping apparatus 3 so that in a line 10, which leads to a control unit 11, the pressure medium is transported with only a small pressure pulsation. By means of the control unit 11, one or more activation apparatus(es) 12 activate one or more shifting element(s) 13 of the mechanical power branch. With the shifting elements 13, different gear ratios may be selected in the mechanical power branch. In this way, both the shifting apparatuses of the mechanical power branch as well as the closed circuit 8 are supplied with pressure medium by one pressure source 1.

Reference Numerals
1 Source of pressure and pressure means
2 A line
3 Damping apparatus
4 A line
5 Control unit
6 Hydrostatic pump
7 Hydraulic power branch
8 Closed circuit
9 Hydrostatic motor
10 A line
11 Control unit
12 Activating apparatus
13 Shifting element

What is claimed is:

1. A power-splitting transmission having a hydraulic power branch (7) and a mechanical power branch, the mechanical power branch having hydraulically activated shifting elements (13), the hydraulic power branch having a hydraulic motor (9) and a hydraulic pump (6), a delivery opening and an intake opening of the hydraulic motor (9) are connected with a delivering opening and an intake opening of the hydraulic pump (6), and a pressure source (1) compensates for leakage in the hydraulic power branch (7) and also supplies pressure to the mechanical power branch, via a controller (11), for activation of the shifting elements (13);

wherein a damping apparatus (3) is located between the pressure source (1) and the hydraulic power branch (7), and the damping apparatus (3) exclusively comprises a volume expansion.

2. The power-splitting transmission according to claim 1, wherein the damping apparatus (3) is placed proximate to the hydraulic power branch (7), and the damping apparatus (3) comprises of a volume expansion provided in a line (2) between the pressure source (1) and the hydraulic power branch (7).

3. The power-splitting transmission according to claim 1, wherein the line (2) between the pressure source (1) and the hydraulic power branch (7) runs within a transmission housing for the most part.

4. The power-splitting transmission according to claim 1, wherein the damping apparatus (3) comprises of a space in the wall of a transmission housing.

5. The power-splitting transmission according to claim 1, wherein the damping apparatus (3) comprises an enlargement of a pipe line (2) connecting the pressure source (1) with the hydraulic power branch (7).

6. The power-splitting transmission according to claim 1, wherein the damping apparatus (3) is placed in a housing of the hydraulic pump (6).

7. The power-splitting transmission according to claim 1, wherein the damping apparatus (3) is placed in a housing of the hydraulic motor (9) of the hydraulic power branch (7).

8. A power-splitting transmission having a hydraulic power branch (7) and a mechanical power branch, the mechanical power branch having hydraulically activated shifting elements (13), the hydraulic power branch having a hydraulic motor (9) and a hydraulic pump (6), a delivery opening and an intake opening of the hydraulic motor (9) are connected with a delivering opening and an intake opening of the hydraulic pump (6), and a pressure-source (1) compensates for leakage in the hydraulic power branch (7) and also supplies pressure to the mechanical power branch, via a controller (11), for activation of the shifting elements (13);

wherein a damping apparatus (3) is located between the pressure source (1) and the hydraulic power branch (7), and the damping apparatus (3) comprises a volume expansion.

* * * * *